United States Patent
Mower et al.

(10) Patent No.: US 8,391,334 B1
(45) Date of Patent: Mar. 5, 2013

(54) COMMUNICATIONS RELIABILITY IN A HUB-SPOKE COMMUNICATIONS SYSTEM

(75) Inventors: Vaughn L. Mower, Bountiful, UT (US); Merle L. Keller, Salt Lake City, UT (US); Roger Baker, South Jordan, UT (US)

(73) Assignee: L-3 Communications Corp, New York, NY (US)

( * ) Notice: Subject to any disclaimer, the term of this patent is extended or adjusted under 35 U.S.C. 154(b) by 365 days.

(21) Appl. No.: 12/891,048

(22) Filed: Sep. 27, 2010

(51) Int. Cl.
*H04B 1/00* (2006.01)
*H04W 72/00* (2009.01)

(52) U.S. Cl. .................. 375/142; 455/456.1; 455/456.5; 455/456.6

(58) Field of Classification Search .................... None
See application file for complete search history.

(56) References Cited

U.S. PATENT DOCUMENTS

| | | | |
|---|---|---|---|
| 5,533,011 A | 7/1996 | Dean et al. | |
| 5,898,362 A * | 4/1999 | Ibanez-Meier et al. | 370/320 |
| 6,061,336 A * | 5/2000 | Baker | 370/320 |
| 6,075,812 A | 6/2000 | Cafarella et al. | |
| 6,553,230 B1 * | 4/2003 | Plestid et al. | 455/436 |
| 6,862,269 B1 | 3/2005 | Nasta | |
| 6,944,211 B2 | 9/2005 | Mower et al. | |
| 7,167,504 B1 | 1/2007 | Mower et al. | |
| 7,200,233 B1 | 4/2007 | Keller et al. | |
| 7,221,665 B1 | 5/2007 | Mower et al. | |
| 7,496,080 B1 | 2/2009 | Mower et al. | |
| 7,580,672 B2 | 8/2009 | Rowitch | |
| RE42,827 E * | 10/2011 | Moon et al. | 370/335 |
| 8,036,686 B2 * | 10/2011 | Rofougaran | 455/456.5 |
| 8,064,923 B2 * | 11/2011 | Rofougaran | 455/456.1 |
| 2004/0042389 A1 | 3/2004 | Schiff | |
| 2004/0121740 A1 * | 6/2004 | Miyano | 455/101 |
| 2007/0156296 A1 | 7/2007 | Wright et al. | |
| 2008/0122706 A1 | 5/2008 | Jalali | |
| 2008/0182573 A1 | 7/2008 | Lauer et al. | |
| 2009/0034448 A1 | 2/2009 | Miller et al. | |
| 2009/0190560 A1 * | 7/2009 | Kim et al. | 370/335 |
| 2010/0265920 A1 * | 10/2010 | Blanz et al. | 370/335 |
| 2010/0272204 A1 * | 10/2010 | Fazel et al. | 375/267 |
| 2010/0277395 A1 * | 11/2010 | Satoh et al. | 343/876 |
| 2010/0322150 A1 * | 12/2010 | Wilcoxson et al. | 370/321 |
| 2011/0103273 A1 * | 5/2011 | Dutta | 370/281 |
| 2012/0021694 A1 * | 1/2012 | Prince et al. | 455/68 |
| 2012/0129606 A1 * | 5/2012 | Rofougaran et al. | 463/39 |
| 2012/0142375 A1 * | 6/2012 | Alles et al. | 455/456.1 |
| 2012/0188131 A1 * | 7/2012 | Landon et al. | 343/700 MS |
| 2012/0196628 A1 * | 8/2012 | Rofougaran | 455/456.5 |
| 2012/0201319 A1 * | 8/2012 | Asplund et al. | 375/267 |
| 2012/0213488 A1 * | 8/2012 | Sato et al. | 386/230 |
| 2012/0275499 A1 * | 11/2012 | Anreddy et al. | 375/219 |

OTHER PUBLICATIONS

U.S. Appl. No. 12/172,739, filed Jul. 14, 2008, Smith.

* cited by examiner

*Primary Examiner* — David C. Payne
*Assistant Examiner* — Bahman Badipour
(74) *Attorney, Agent, or Firm* — Kirton McConkie

(57) ABSTRACT

Systems and methods for improving the reliability of a hub-spoke communications system use a first antenna and a second antenna at the hub terminal. Spread spectrum transmission from the hub terminal uses the first antenna, and the second antenna is enabled when blockage between the first antenna and any one of the spoke terminals is present. The first antenna and the second antenna have substantially orthogonal polarizations. The spread spectrum transmissions from the first antenna and second antenna have different pseudonoise code timing so that the received transmissions are offset by at least one chip interval from each other.

21 Claims, 6 Drawing Sheets

Azimuth

|  | 0-40 | 40-80 | 80-120 | 120-160 | 160-200 | 200-240 | 240-280 | 280-320 | 320-360 |
|---|---|---|---|---|---|---|---|---|---|
| 0-15 | Y | - | Y | Y | Y | Y | Y | - | Y |
| 15-30 | - | - | Y | - | Y | - | Y | - | - |
| 30-45 | - | - | - | - | Y | - | - | - | - |
| 45-60 | - | - | - | - | - | - | - | - | - |
| 60-90 | - | - | - | - | - | - | - | - | - |

Elevation

COMMUNICATIONS RELIABILITY IN A HUB-SPOKE COMMUNICATIONS SYSTEM

FIELD

The present application relates to wireless communications systems. More particularly, the present application relates to improving communications reliability in wireless hub-spoke networks.

BACKGROUND

Wireless communications is becoming increasingly important, with wireless systems finding their way into every growing numbers of applications. Wireless systems are become ubiquitous in the military environment.

A common arrangement for a wireless network is a hub-spoke communications system. In a hub-spoke communications system, a hub terminal communications with a number of spoke terminals. For example, a hub terminal can communicate with spoke terminals within a geographic area in which the hub terminal is centrally located. Of course, such a physical arrangement is not essential, and a hub terminal need not be centrally located among the spoke terminals. Examples of hub-spoke communications systems include cellular networks (where a base station is an example of a hub terminal, and mobile terminals are examples of spoke terminals) and satellite networks (where a satellite is an example of a hub terminal, and ground terminals are examples of spoke terminals). Networks can also include multiple hub terminals.

In a hub-spoke network, communications between spoke terminals can be routed through the hub terminal (or through multiple hub terminals). For example, communications from spoke terminals can be to the hub terminal via an uplink (e.g., one or more channels), and communications from the hub terminal to spoke terminals can be on a downlink (e.g., one or more channels). Thus, for example, a message from a first spoke terminal to a second spoke terminal can be sent from the first spoke terminal to the hub terminal on the uplink, and then sent from the hub terminal to the second spoke terminal on the downlink. On one hand, this architecture can provide for increased communications capability, as spoke terminals need not be able to communicate directly (e.g., need not have line-of-sight connectivity to each other). On the other hand, the relay through the hub can reduce reliability, as interruptions in communications on either the uplink or the downlink can result in the loss of a message. Moreover, in communications systems where the hub terminal is disposed on a mobile platform, there can be an increased likelihood of blockage on either the uplink or downlink which can further reduce end-to-end message transfer reliability.

SUMMARY

In some embodiments of the invention, a method of improving the reliability of a hub-spoke communications system is provided. The method can include obtaining a communications system which includes a hub terminal and two or more spoke terminals. The hub terminal can have a first antenna with a first polarization and a second antenna with a second polarization, and the first polarization can be substantially orthogonal to the second polarization. The first antenna and second antenna can be located at different positions on the hub terminal.

The method can include transmitting downlink data using a first direct sequence spread spectrum signal and a second direct sequence spread spectrum signal to the spoke terminals. The transmitting can use the first antenna to transmit the first direct sequence spread spectrum signal to one or more of the spoke terminals. The transmitting can use the second antenna to transmit the second direct sequence spread spectrum signal to one or more of the spoke terminals. The first and second spread spectrum signals can use the same pseudonoise spreading code, but offset in time relative to each other. In particular, the pseudonoise spreading code can be offset in time for the first direct sequence spread spectrum signal relative to the second direct sequence spread spectrum signal such that, at an intended receiver, the first direct sequence spread spectrum signal is offset by at least one chip interval relative to the second direct sequence spread spectrum signal at an intended receiver.

Another operation in the method can be determining blockage time periods when physical blockage by the hub terminal is predicted to interrupt communications between the first antenna and each of blocked ones of the spoke terminals. During blockage time periods, the second antenna can be used to transmit the second direct sequence spread spectrum signal to the blocked ones of the spoke terminals.

In some embodiments, a hub terminal for improving communications reliability in a hub-spoke communications system is provided. The system can include one or more spoke terminals. The hub terminal can include a direct sequence spread spectrum transmitter capable of transmitting a direct sequence spread signal using a pseudonoise spreading code. The hub terminal can also include a first antenna and a second antenna coupled to the transmitter. The first antenna can have polarization which is substantially orthogonal to the polarization of the second antenna. The first antenna and the second antenna can have different fields of view.

The hub terminal can include a delay element, switch, and a controller. The delay element can be disposed between the transmitter and at least one of the first antenna and the second antenna, wherein the delay line provides a delay of at least one chip interval of the pseudonoise spreading code. The switch can be disposed between the transmitter and the second antenna. The controller can close the switch during time periods during which blockage is present between the first antenna and any of the plurality of spoke terminals and open the switch during time periods during which no blockage is present between the first antenna and any of the plurality of spoke terminals.

In some embodiments, a spoke terminal for improving communications reliability in a hub-spoke communications system is provided. The system can include a hub terminal. The spoke terminal can include an antenna subsystem capable of reception using at least a first polarization and a second polarization, the first polarization being substantially orthogonal to the second polarization. The spoke terminal can also include a direct sequence spread spectrum receiver coupled to the antenna subsystem and capable of receiving a direct sequence spread spectrum signal using a pseudonoise spreading code.

The spoke terminal can also include a controller coupled to the receiver and the antenna subsystem. The controller can accept command data embedded within the spread spectrum signal from the receiver, select a polarization used by the antenna subsystem according to the command data, and adjust a timing of the direct sequence spread spectrum receiver according to the command data.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
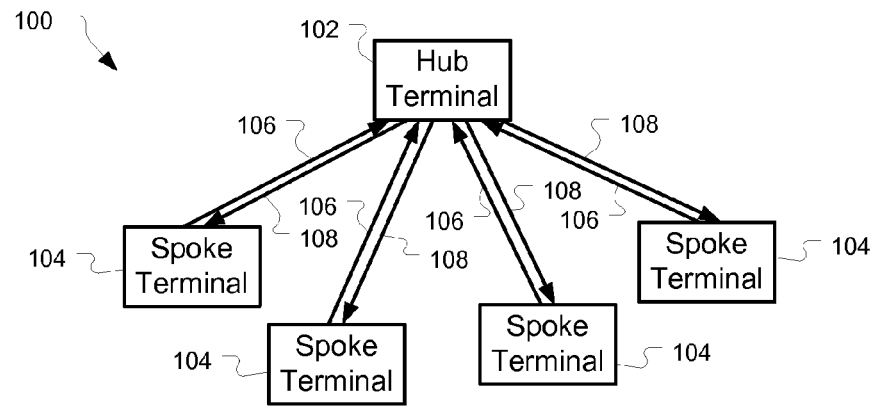
FIG. 1 is a block diagram of a system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a terminal includes reference to one or more terminals.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, the time at which two events occur may be substantially the same even though the exact time of the two events differs slightly due to differences in propagation delay, clock error, clock jitter, or similar factors. As another example, two items may be substantially aligned, even though they are not exactly aligned due to mechanical tolerances, electrical tolerances, thermal variation, static or dynamic loading or flexing, or similar factors.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also includes individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and applies regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

Turning to FIG. 1, a system is illustrated in accordance with some embodiments of the present invention. The system, shown generally at 100, can include a plurality of terminals. For example, a hub terminal 102 can be in communication with a plurality of spoke terminals 104 via one or more uplinks 106 and downlinks 108. The hub terminal can be a mobile terminal, for example, disposed on an airborne platform. The communications system can use radio frequency signals for communications of data between the spoke terminals and the hub terminal. The communications system can use time division multiple access (TDMA), frequency division multiple access (FDMA), code division multiple access (CDMA), or combinations thereof. For example, communications on the downlink can be broadcast, where all spokes listen to the same downlink channel, and data for different spoke terminals is transmitted at different times. As another example, communications on the uplink can use TDMA, where each spoke terminal transmits to the hub terminal in a different time slot. The hub can communicate slot assignments to the spoke terminals on the downlink. Combinations of TDMA, FDMA, and/or CDMA can be used. For example, individual spoke transmissions can be in different time slots but can also include code division multiple access encoding. The uplink and/or downlink can include one or more channels, the channels being defined by different frequencies, different CDMA codes, or different time slots. Access control to the uplink by the spoke terminals can be, for example: random, contention based, or controlled by the hub terminal.

Examples of hub-spoke systems in which embodiments of the present invention can be applied are illustrated in U.S. Pat. Nos. 6,944,211; 7,167,504; 7,221,665; and 7,496,080, each of which is incorporated herein by reference to the extent that their disclosure does not conflict with the present application.

The spoke terminals 104 can be arbitrarily located with respect to the hub terminal 102. For example, an airborne hub terminal may be generally above a plurality of ground spoke terminals. In contrast, airborne spoke terminals may be generally above a ground hub terminal.

As another example, airborne spoke terminals may be either above or below an airborne hub terminal. In some cases, temporary blockages can occur between the hub terminal and one or more of the spoke terminals. For example, blockage may occur for an airborne hub terminal due to the wings, fuselage, or other portions of the aircraft being positioned within the line of sight path between the airborne hub terminal antenna and the spoke terminal. In other words, the field of view of the antenna can be limited due to blockage from portions of the platform on which the antenna is mounted. Blockages can be temporary, as the line of sight directions can change due to motion of the hub terminal and/or spoke terminal, and orientation changes of the hub terminal.

Figure 2A:
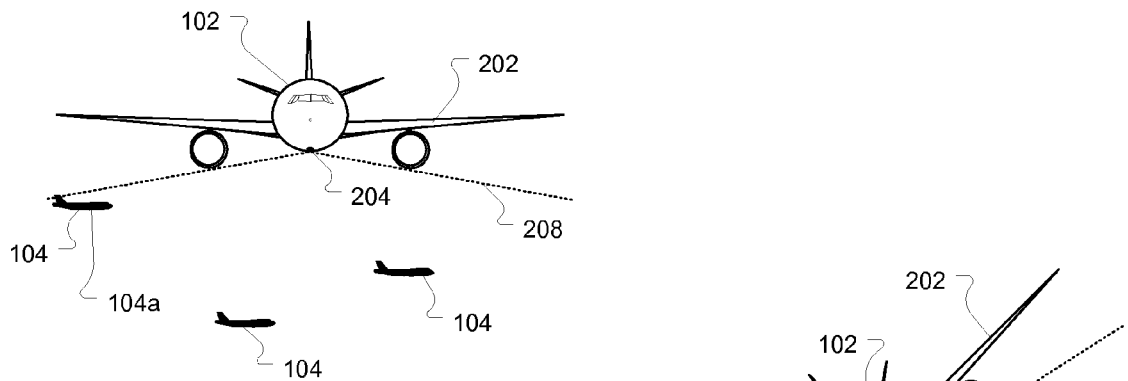
FIG. 2A is an illustration of an airborne hub terminal showing an antenna field of view.
Figure 2B:
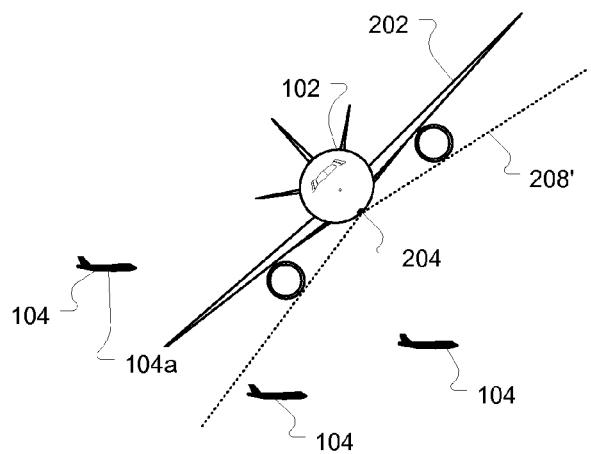
FIG. 2B is an illustration of an airborne hub terminal showing a shifted antenna field of view during a turn.

For example, FIGS. 2A-2B illustrate an example of a hub terminal 102 disposed on an aircraft 202. The hub terminal can include an antenna 204 which can be, for example, mounted on the bottom of the aircraft. The antenna provides a field of view 208, which for example, provides coverage of an area generally below the aircraft. In FIG. 2B, the aircraft is performing a banked turn, from which it can be seen that the field of view 208' is shifted. Links to some spoke terminals 104 may be blocked by portions of the aircraft fuselage. A spoke terminal (e.g., 104a) which was within the field of view 208 during level flight (FIG. 2A) may no longer be in the field view 208' (FIG. 2B) during a turn. Similarly, spoke terminals may pass through areas which are outside the field of view 208 resulting in temporary blockages.

Figure 3:
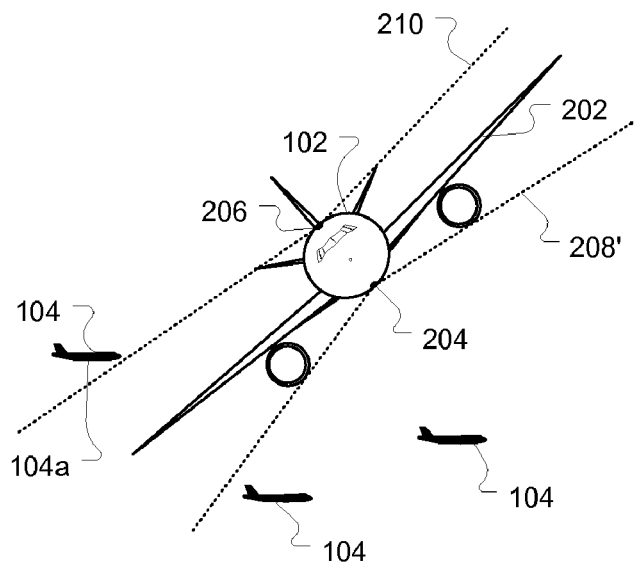
FIG. 3 is an illustration of an airborne hub terminal using two antennas in accordance with some embodiments of the present invention.

Adding one or more additional antennas on the aircraft at different locations can help to address interruptions due to blockage, as the antennas can have different fields of view. For example, a second antenna 206 can be located on the top of the aircraft as shown in FIG. 3. The second antenna provides a field of view 210, which is different than the field of view 208' of the first antenna 204. It will be appreciated that antennas mounted in different locations will generally have different fields of view, in that there may be areas within the field of view of one antenna that are not within the field of view of the other antenna. Two antennas with different fields of view can also have some areas which overlap. That is, some areas may be in the field of view of both antennas.

The additional antenna 206 can provide an alternate path to the terminal 104a, helping to avoid the problem caused by blockage. The inclusion of additional antennas, however, presents several challenges. For example, simply transmitting the same signal from the hub via multiple antennas can result in interference for spoke terminals which have visibility of more than one antenna (e.g., are in the field of view of both antennas). Hence, while communications reliability to a blocked spoke terminal may be improved in such a situation, communications reliability to unblocked spoke terminals may be degraded. Accordingly, in accordance with some embodiments of the invention, this potential interference can be mitigated by using one or more of: switching on and off the second antenna, using a different (e.g., orthogonal) polarization for the multiple antennas, and using spread spectrum processing gain to allow for separation of the signals transmitted from the multiple antennas.

In some embodiments, the hub terminal 102 can switch which of multiple antennas is being used in a dynamic manner. For example, for uplink communications between the spoke terminals 104 and the hub terminal 102 in a time division multiple access (TDMA) scheme, the hub terminal can switch between the antennas slot by slot as needed to receive different spoke terminals. As another example, for communications of code division multiple access (spread spectrum) signals, the hub terminal can use time shifted versions of the uplink spreading code for communication with different spoke terminals on the different antennas, helping to mitigate interference. As another example, the antennas can use substantially orthogonal polarizations. These examples will be explained in further detail below.

Turning first to the downlink 108, downlink data can be transmitted from the hub terminal 102 to the spoke terminals 104 using a direct sequence spread spectrum signal. The transmissions can normally be from the first antenna 204, for example, when the aircraft is in level flight. The hub terminal can determine when there is blockage to one or more spoke terminals, for example, using techniques described further below. Transmission from the second antenna 206 can be enabled whenever there is blockage to one or more spoke terminals, and disabled whenever there is no blockage to any of the spoke terminals. When there is blockage, the hub terminal can also transmit a modified version of the spread spectrum signal using the second antenna 206. For example, the modified version of the spread spectrum signal can be a time shifted version. The amount of time shift can be sufficient so that the pseudonoise spreading code arrives at the spoke terminals shifted at least one chip with respect to the spreading code from the first hub antenna. In particular, it will be understood that a spread spectrum signal can be formed by combining the data communicated by the spread spectrum signal with a spreading code using direct sequence spreading. The spreading code can comprise a pseudorandom sequence of chips. Various spreading codes can be used, including for example, composite spreading codes, which are formed from a plurality of component codes.

By providing sufficient time delay between the spread signals transmitted from the first and second hub antennas on the downlink, interference between the signals from the first antenna 204 and the second antenna 206 can be greatly reduced based on the autocorrelation properties of the pseudonoise spreading code. For example, typical spreading codes provide a low autocorrelation of $1/100$ or less for offsets of more than one chip time (wherein the value of the peak autocorrelation value at a time offset of zero is defined as 1). Accordingly, two signals using the same spreading code which are offset in time by at least one chip time will typically have a low crosscorrelation. Hence, when detection of one signal using a first timing is performed (e.g., using a correlator), other signals having different timing (e.g., more than one chip time offset) are rejected. This rejection property is also the basis of some code division multiple access techniques. Delay of several chips or many tens of chips can be used. Generally, the delay can be much less than a data symbol time. For example, the delay may be less than 10%, less than 5%, or less than 1% of a data symbol time.

Figure 4:
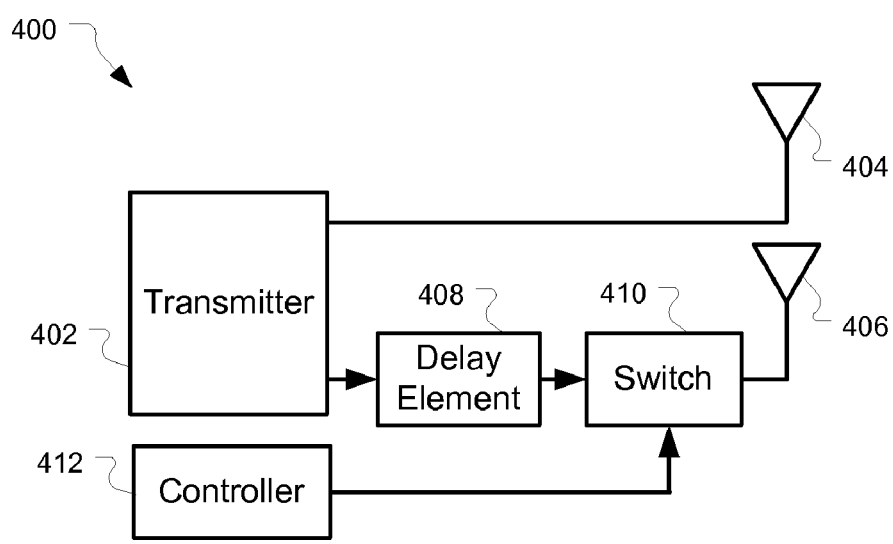
FIG. 4 is a block diagram of a hub terminal in accordance with some embodiments of the present invention.

FIG. 4 illustrates a block diagram of one example of a hub terminal 400 which can be used within the system 100 of FIG. 1 (e.g., hub terminal 102). The hub terminal can include a direct sequence spread spectrum transmitter 402. The transmitter can accept data (not shown) for transmission to the spoke terminals (e.g., spoke terminals 104). The transmitter can combine the data with a pseudonoise spreading code to form a direct sequence spread signal. The transmitter can include one or more spreaders, modulators, encoders, upconverters, filters, local oscillators, mixers, frequency references, amplifiers, and the like.

The hub terminal 400 can also include a first antenna 404 and a second antenna 406. The first antenna and second antennas can be coupled to the transmitter, and can have substantially different polarizations. For example, the first antenna can be right hand circularly polarized, and the second antenna can be left hand circularly polarized. As another example, the first antenna can be horizontally polarized and the second antenna can be vertically polarized. The foregoing examples are not exhaustive, and other types and combinations of polarization can be used. It will be appreciated that antennas do not have perfect polarization, and exhibit some response at polarizations other than the antenna's nominal polarization. For example, a left-hand circularly polarized antenna may exhibit some response to right-hand circularly polarized signals. One measurement of antenna polarization accuracy is axial ratio, which is the ratio (usually in decibels) between the primary or nominal polarization and a theoretically orthogonal polarization. Axial ratio may vary depending on where in an antenna pattern it is measured. For example, for a hub antenna with broadbeam coverage, the axial ratio at the edge of the antenna coverage zone may be significantly degraded relative to that at the beam peak. This may result, for example, in relatively low cross-polarization isolation between of about 10 dB. This cross-polarization isolation by itself may be insufficient to mitigate interference of two downlink signals at the spoke's receiver. Hence, additional isolation can be provided using the properties of the spread spectrum pseudo noise code isolation as discussed further below. It will be understood that two antennas may be orthogonally polarized, but may not be perfectly orthogonal due to the axial ratio, inaccuracies in physical mounting, and other factors.

The first antenna 404 and second antenna 406 can have differing fields of view. For example, one of the antennas can be mounted on one side (e.g., the top or the left side) of the platform, and the other one of the antennas can be mounted on the other side (e.g., the bottom or the right side) of the platform. The first antenna can be coupled directly to the transmitter 402 (e.g., without a switch and/or delay element) and the second antenna can be coupled to the transmitter through a delay element 408 and a switch 410. The delay element can provide a delay of at least one chip interval of the pseudonoise code. Generally, multiple chip intervals of delay can be provided to help ensure that the signals received from the two antennas have at least a one-chip interval difference in spreading code timing, as discussed further below. Various types of delay elements can be used, including for example, a transmission line, a delay line, a surface acoustic wave device, and the like. The switch can be closed to connect the transmitter to the second antenna, or opened to disconnect the transmitter from the second antenna. Various types of switches can be used, including for example, relays, PIN diodes, attenuators and the like.

Depending on the geometry of an intended receiver (e.g. a spoke terminal 104) relative to the first antenna 404 and the second antenna 404 of the hub terminal 102, additional delay differences between signals received from the antennas may occur. For example, for a spoke terminal which is equidistant from the two antennas, the sole source of delay difference between the signals from two antennas at the spoke terminal will be from the delay element 408. More typically, a spoke terminal will have differing path lengths to the two antennas, however, and this difference in path length will translate into additional relative delay between the signals. This additional delay can be in the same direction (and thus add) to the delay introduced by the delay element, or this additional delay can be in the opposite direction (and thus subtract) from the delay introduced by the delay element. For example, when the antenna for which the transmitted signal has been delayed is closer to the intended receiver than the other antenna, the difference in path length will tend to subtract from the delay introduced by the delay element. In the extreme, for a spoke terminal aligned directly along a line passing through the two antennas, the added (or subtracted) delay due to this effect can be equal to the propagation delay between the two antennas (e.g., this distance between the antennas divided by the signal propagation velocity). Accordingly, the delay element can provide a delay which is greater than or equal to the propagation delay between the two antennas plus one chip interval to help ensure that the resulting difference is at least one chip interval at an intended receiver. For example, if the first antenna and second antenna are separated by 9 meters, the maximum additional delay due to propagation path differences for radio signals would be about 30.0 ns. Hence, the delay element should provide at least one chip interval plus the 30 ns to help ensure that the resulting delay at the intended receiver is at least the one chip interval.

It is to be appreciated that the delay provided by the delay element also depends on the chip interval, and hence the chipping rate. Accordingly, if the system operates with one or more different chip rates, the delay provided by the delay element can also correspond to the one chip interval at the lowest chipping rate (i.e., the longest chip interval used by the system). For example, for a chipping rate of 150 Mchips/second, the corresponding chip interval is 6.7 ns. Considering the example above where the first antenna and second antenna are separated by 9 meters, the delay provided by the delay element can be at least about 36.7 ns. In general, providing several chips of delay may be used to help make the correlation peaks even more distinct. Hence, for this example, a delay of at least about 51 ns can be used.

As another example, an antenna separation of 3 meters results in a maximum additional delay of about 10.0 ns. For a chipping rate of 15 Mchip/sec, the chip interval is about 66.7 ns. In such a situation, the additional delay due to the path length differences may be neglected.

The order of the delay element 408 and switch 410 is not critical, and their positions can be reversed (placing the switch closer to the transmitter 402 and the delay element closer to the second antenna 406). Alternatively, the delay element can be disposed between the transmitter and the first antenna 404, and the switch disposed between the transmitter and the second antenna, as will become more apparent from the below discussion. Moreover, it is to be appreciated that additional elements can be included within the transmission path such as power amplifiers and/or upconverters, which can be positioned on either the transmitter or the antenna side of the switch. For example, the spread spectrum transmitter can output an intermediate frequency signal which is passed through the delay element, and then upconverted and amplified prior to being provided to one of the antennas.

A controller 412 can be coupled to a control terminal of the switch to control the switch (e.g., open or close the switch). The controller can close the switch (connecting the transmitter to the second antenna 406) during time periods during which blockage is present between the first antenna and any of the spoke terminals.

The controller 412 can open the switch 410 (disconnecting the transmitter 402 from the second antenna 406 to disable transmission) during time periods during which no blockage is present between the first antenna 404 and any of the spoke terminals 104. This can help to reduce interference to spoke terminals receiving transmissions from the first antenna. Moreover, during the time periods where there is no blockage, spread spectrum processing gain may not be needed. Hence, if desired, the amount of spreading can be reduced or disabled. In such a case, operation at higher data rates may be possible during time periods where there is no blockage, since less processing gain is needed. Conversely, during time periods where there is blockage, the transmission data rate may be reduced to provide increased amounts of processing gain. Determination of blockage time periods can be performed by the controller 412 as will now be described.

In some embodiments, the controller 412 can monitor when the hub platform is going to make a turn. For example, some inertial navigation systems provide a "time to turn" status that can be used to determine when a turn is about to happen. An interface (not shown) can be provided between the inertial navigation system and the controller (e.g., a MIL-STD-1553 bus). Turns are likely to result in blockage, hence when a turn is occurring, transmission from the second antenna can be activated.

Figures 5, 6:
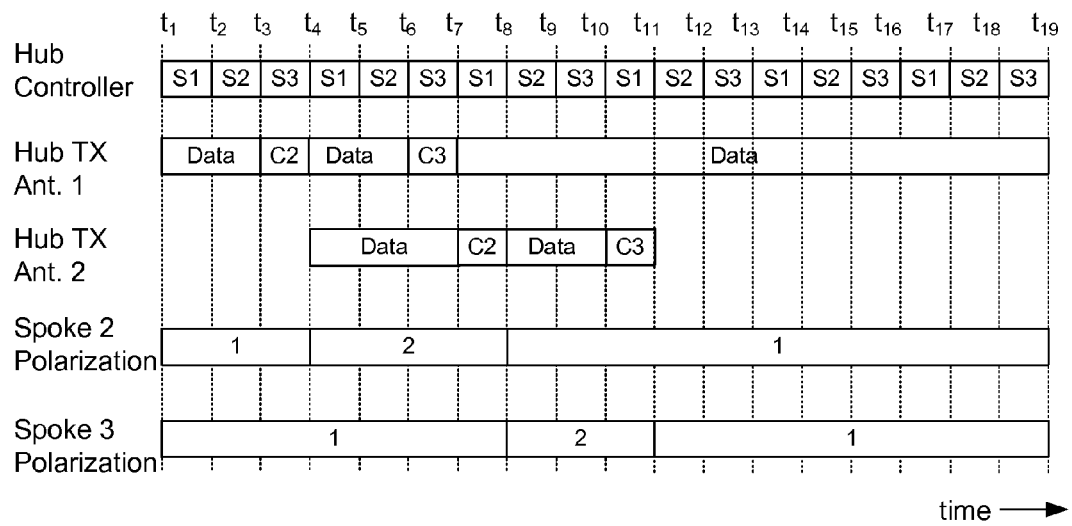
FIG. 5 is an example of a blockage data base in accordance with some embodiments of the present invention.
FIG. 6 is a timing diagram showing operation of a hub controller, hub transmissions, and spoke receptions in accordance with some embodiments of the present invention.

In some embodiments, a more accurate prediction of when blockage is going to occur can be made. The controller 412 can use a predicted position of each of the spoke terminals 104 to determine a pointing angle from the hub terminal 102 to each spoke terminal. The pointing angles can be compared to a blockage database to determine when blockage for each antenna is present. For example, FIG. 5 provides an example of a blockage database organized by azimuth and elevation, in which blockage zones are indicated by a "Y" entry. FIG. 5 is just an example, and an actual blockage database can provide greater or lesser resolution than that illustrated in FIG. 5.

A process for determining when blockage of a spoke terminal exists (i.e., a hub terminal blockage process) can proceed at a hub terminal as follows:

Obtain the spoke terminal predicted position (e.g., latitude, longitude, altitude) at time t (e.g., using current position and a velocity vector)
 Determine the hub terminal predicted position at time t
 Subtract the spoke terminal predicted position from the hub terminal position to obtain a pointing vector
 Rotate the pointing vector to account for hub terminal platform orientation (e.g., convert from earth centered coordinates to platform relative coordinates)
 Compare the pointing vector to a table of blockage directions for the first antenna to determine if the first antenna is blocked (e.g., using a database like FIG. 5)

The process can be repeated for each spoke terminal within the system. The process can be repeated for each spoke terminal at a processing interval (e.g., after processing for time t, processing for time t+dt, where dt is a processing interval). The processing interval can be regular (e.g., dt=0.1 or 10 seconds), or the processing interval can be irregular. For example, processing can repeated at longer intervals for spoke terminals for which the pointing angle is changing slowly, and can be repeated at shorter intervals for spoke terminals for which the pointing angle is changing rapidly. As another example, processing can be repeated at shorter intervals for spoke terminals for which the pointing angle is close to a blockage (e.g., when the pointing angle is a cell of the database illustrated in FIG. 5 that is adjacent to a cell which indicates blockage). Prediction of blockages at future time intervals can be helpful to allow switching antennas and commanding the spoke terminals before the blockage occurs to help prevent loss of data.

When blockage between the first antenna 404 and a spoke terminal (hereinafter referred to as the "blocked spoke terminal") is detected, the controller 412 can close the switch 410 to allow transmission through the second antenna 406 to occur. Note that transmission from the first antenna 404 can be continued to allow for communication with other (unblocked) spoke terminals.

As alluded to above, for unblocked spoke terminals, interference between transmissions from the first antenna 404 and the second antenna 406 can be mitigated by several factors. First, because the first antenna and second antenna have different (e.g., substantially orthogonal) polarizations, this helps to reduce interference, since a spoke terminal matching the polarization of the first antenna will tend to reject the signal from the second antenna. In some situations, however, the amount of rejection can be less than desired. For example, the polarizations may not be perfectly orthogonal due to finite axial ratio of the antennas. Also, various factors can cause a change in polarization of the signals during propagation between the hub and spoke. For example, reflections (e.g., from multipath) of the signal can have random polarization. Hence, the introduction of a time difference between the transmissions on the first antenna and the second antenna provides additional reduction of interference due to the processing gain of the direct sequence spreading.

Because the first antenna 404 and second antenna 406 have different polarizations, the hub terminal 400 can transmit command data to the blocked spoke terminal informing it to switch polarization when it should switch which polarization it is using. Similarly, the hub terminal can also transmit command data to the blocked spoke terminal informing it to shift timing. For example, when the first antenna is about to be blocked, the hub terminal can instruct the blocked terminal (prior to the blockage occurring) to switch from the polarization matching the first antenna to the polarization matching the second antenna, and switch receiver timing to move timing later by a delay equal to the amount of delay introduced by the delay element 408. Alternatively, if the delay element 408 is between the transmitter 402 and the first antenna 404, the hub terminal can instruct the spoke terminal to move its timing earlier when switching from the first antenna to the second antenna. Thus, the spoke terminal can provide polarization selection and timing adjustment information to each spoke terminal as necessary so that spoke terminals use an unblocked antenna and maintain timing synchronization.

FIG. 6 illustrates a timing diagram of one example of system operation in accordance with some embodiments of the invention. Although the example is illustrated using three spoke terminals, it is to be understood that the system can have one, two, three, or more spoke terminals. The hub controller 412 periodically checks for blockage for each spoke terminal, represented by processing time slices labeled S1, S2, S3, etc. For example, at time t=2, the controller may determine that a blockage is going to occur from time t=4 to time t=8 for spoke terminal 2. At time t=3, the controller can therefore initiate a command transmission C2 to spoke terminal 2, instructing it to switch from the first polarization to the second polarization, which spoke terminal 2 executes at time t=4. At time t=4 the hub terminal can close the switch 410 to enable transmission on the second antenna 406. Note that transmission on the first antenna 404 can continue since transmissions to spoke terminals 1 and 3 are not blocked. The command transmission can be interspersed with data transmissions which are transmitted on the first antenna.

At time t=3, the controller may also determine that a blockage is going to occur from time t=8 to time t=11 for spoke terminal 3. Hence at time t=6, the controller can initiate a command transmission to spoke terminal 3, instructing it to switch from the first polarization to the second polarization, which spoke terminal 3 executes at time t=8.

At time t=7, the hub terminal can command spoke terminal 2 to return to using the first polarization since the blockage will end at t=8. The command can be sent on the second antenna, since that is where the spoke terminal is receiving from. Transmission of data on the second antenna can continue, however, since spoke terminal 3 is blocked on the first antenna and is thus receiving on the second antenna. At time t=10, the hub terminal can command spoke terminal 3 (on the second antenna) to return to using the first polarization since the blockage will end at t=11. At time t=11, since no spoke terminals are blocked, the switch 410 can be opened to disable transmissions via the second antenna 406.

Figure 7:
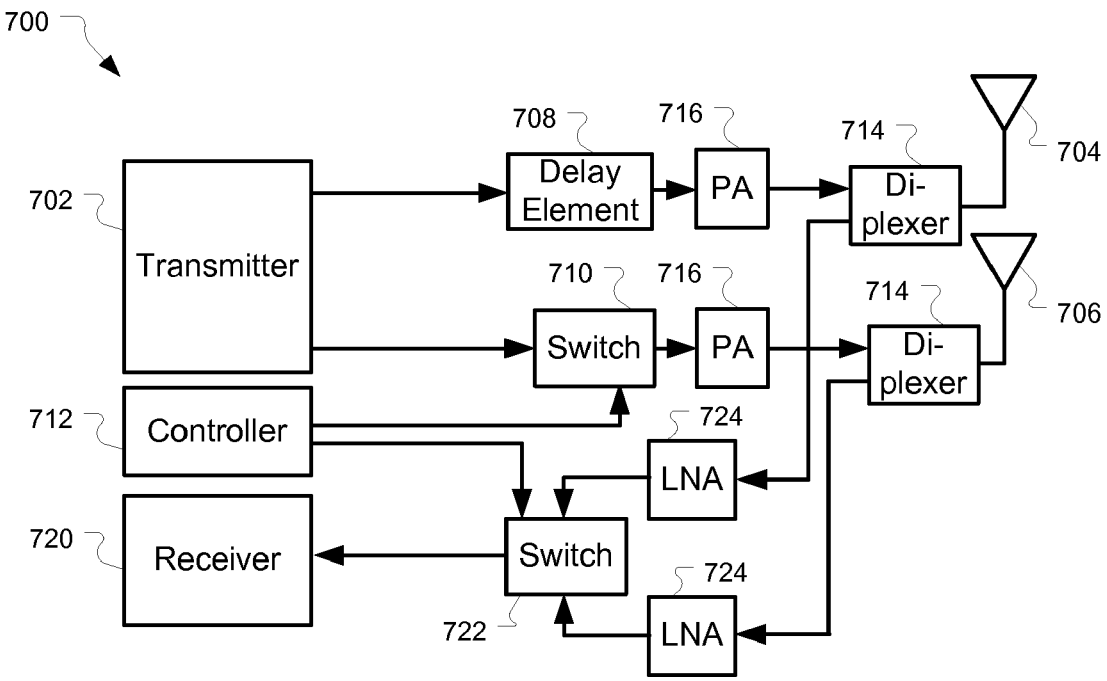
FIG. 7 is a block diagram of another hub terminal in accordance with some embodiments of the present invention.

Turning to the uplink, a hub terminal can also include a receiver. For example, FIG. 7 illustrates another example of a hub terminal 700 which can be used in the system of FIG. 1. The hub terminal can include a receiver 720 coupled to a first antenna 704 and a second antenna 706. The first antenna and second antenna can be used for both reception and transmission, and can be like antennas 404, 406. The hub terminal can include a transmitter 702, delay element 708, and first switch 710, which can be like transmitter 402, delay element 408, and switch 410. If desired, diplexers 714 can be used to separate the transmit and receive signals when frequency division duplex is used. Alternatively, the antennas can be switched between the transmitter and receiver when time division duplex is used (e.g., replacing the diplexers with additional switches). The receiver can include one or more despreaders, demodulators, decoders, downconverters, filters, automatic gain control circuits, local oscillators, mixers, frequency references, amplifiers, and the like.

The receiver 720 can be coupled to the first antenna 704 and the second antenna 706 through a second switch 722. The first switch 710 can be controlled by a controller 712 in a similar manner as described above (e.g., as described for controller 412). The second switch 722 can also be controlled by the controller, for example as described above. For example, the spoke terminals 104 can transmit to the hub terminal 102 using code division multiple access or frequency division multiple access, in which case the controller can open and close the second 722 switch in a similarly manner as the first switch 710. Using a switch to select which antenna is connected to the receiver can provide advantages over alternative techniques, such as for example, using a combiner, since a combiner would result in twice as much noise input to the receiver and degrade the performance.

As another example, the spoke terminals 104 can transmit to the hub terminal 102 using time division multiple access, where spoke terminal transmit in different, non-overlapping, time slots. For a time division multiple access uplink, the controller 712 can control the second switch 722 for each time slot to select one of the antennas for receiving each spoke terminal transmission. In particular, based on time slot assignments of the spoke terminals to time slots, the controller knows in each time slot which spoke terminal should be received, and based on the blockage time intervals, the controller knows in each time slot which antenna the spoke terminal should be received with. The switch can thus be controlled accordingly. If desired, power amplifiers 716 and low noise amplifiers 724 and other elements (e.g., filters) can be provided within the transmit and receive paths between the switches 710, 722 and the antennas 704, 706.

Data transmitted from the spoke terminals 104 to the hub terminal 102 on the uplink 106 can include location information which is received by the receiver 720. The location information can be passed to the controller 712 for use in predicting blockages as discussed above. For example, spoke terminals can periodically transmit their current location and velocity information to the hub terminal. As another example, spoke terminals can determine their predicted location at a future time, and transmit predicted location information to the hub terminal.

As an alternative, blockage prediction can be performed by the spoke terminals 104, and predicted blockage passed to the hub terminal 102. For example, each spoke terminal can determine the pointing angle between the hub terminal and the spoke terminal using a predicted position of the hub terminal and the predicted position of the spoke terminal. Determination of the pointing angle can be performed in a similar manner as described above, and thus need not be repeated. The blockage database and hub terminal location/orientation information (e.g., predicted position or current position and velocity information) can be broadcast from the hub terminal to all of the spoke terminals.

A process for determining when blockage of a spoke terminal exists (i.e., a spoke terminal blockage process) can proceed at a spoke terminal as follows:

Obtain the hub terminal predicted position (e.g., latitude, longitude, altitude) at time t (e.g., using current position and a velocity vector)

Determine the spoke terminal predicted position at time t

Subtract the spoke terminal predicted position from the hub terminal position to obtain a pointing vector Rotate the pointing vector to account for hub terminal platform orientation (e.g., convert from earth centered coordinates to platform relative coordinates)

Compare the pointing vector to a table of blockage directions for the first antenna to determine if the first antenna is blocked (e.g., using a database like FIG. 5)

Figure 8:
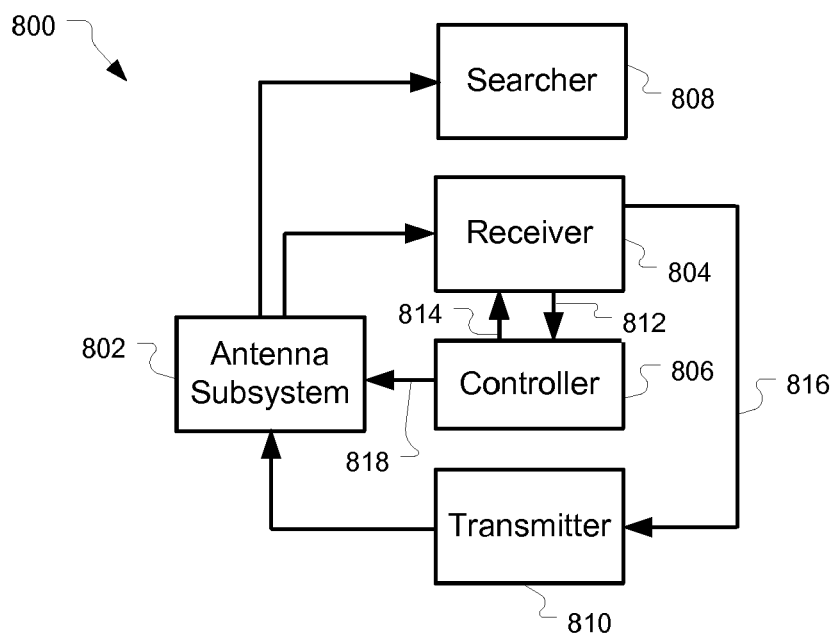
FIG. 8 is a block diagram of a spoke terminal in accordance with some embodiments of the present invention.

FIG. 8 provides an example of spoke terminal 800, which can be used in the system 100 of FIG. 1. The spoke terminal can include an antenna subsystem 802 capable of reception using at least a first polarization and a second polarization, wherein the first polarization and second polarization are substantially orthogonal to each other. For example, a polarization agile antenna can be used. As another example, two antennas with different polarizations can be used, and a switch used to switch between the antennas.

The spoke terminal 800 can include a direct sequence spread spectrum receiver 804 coupled to the antenna subsystem 802. The spread spectrum receiver can receive the transmissions from the hub terminal on the downlink using a pseudonoise spreading code.

Coupled to the receiver 804 can be a controller 806. The controller can accept command data 812 (e.g., command data embedded within the spread spectrum signal by the hub transmitter) and extracted by the receiver. For example, the command data can provide instructions regarding the polarization and receive timing to be used by the spoke terminal as described above. Accordingly, the controller can provide polarization selection control 818 of the antenna subsystem 802, and can providing timing control information 814 to the receiver. For example, the controller can adjust the timing of the receiver by either advancing timing or retarding timing of the receiver by a predefined amount of time delay (e.g., the time delay of the delay element in the hub terminal) whenever a command is received from the hub terminal which instructs the spoke terminal to switch polarization (i.e., switch which antenna on the hub terminal the spoke terminal is listening to).

Figure 9:
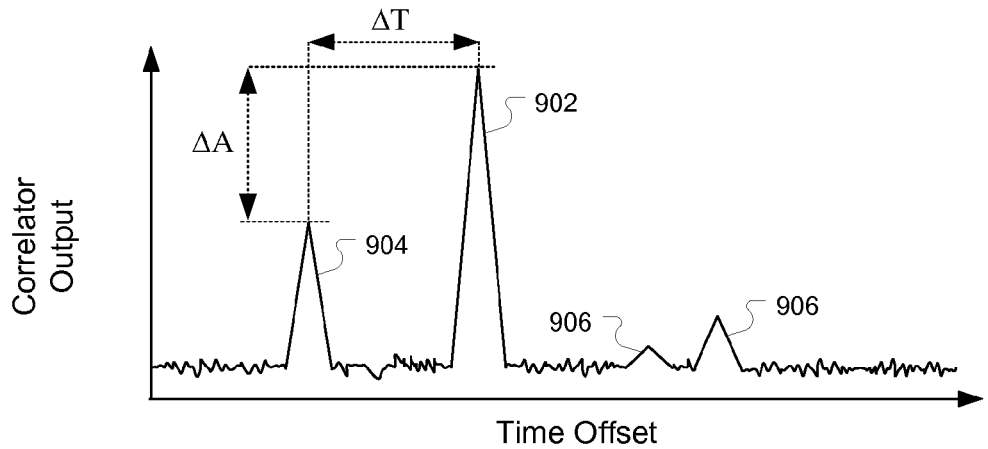
FIG. 9 is an illustration showing searcher output for different time offsets in accordance with some embodiments of the present invention.

The spoke terminal can include a searcher 808 coupled to the antenna subsystem 802 for detecting spread spectrum signals. For example, the searcher can include one or more correlators which correlate the signal received from the antenna with a locally generated pseudonoise spreading code. When the locally generated pseudonoise spreading code is time aligned with the pseudonoise spreading code of the downlink, a correlation peak may be detected. When the downlink is being transmitted on both the first antenna and the second antenna, it is possible that two different correlation peaks may be detected, one peak corresponding to the signal from the first antenna and one peak corresponding to the signal from the second antenna. The correlation peaks can be separated in time by the predefined time delay of the delay element in the hub terminal. FIG. 9 illustrates an example of a correlator output which may be obtained by performing correlations at a number of different time positions, showing a desired timing position (large correlation peak) 902 and an undesired timing position (smaller correlation peak) 904. The peaks are separated in time by $\Delta T$ which is equal to the predefined time delay of the delay element in the hub terminal.

The large correlation peak 902 may correspond to the correlation with the signal received using a matched polarization, while the smaller correlation peak 904 may correspond to the correlation with the signal received using a mismatched polarization. The difference in the correlation peak amplitudes, AA is a function of the polarization accuracy of the antennas. The higher the axial ratio of the antennas is, the larger the AA difference in the correlation peaks that results. There may also be even smaller undesired correlation peaks 906, for example, due to multipath reflections which can have random polarizations.

When the axial ratio of the antennas is low, or signals are very strong, the undesired correlation peak(s) 904 (906) may have significant amplitude, in which case locking onto the weaker signal could occur. To mitigate this possibility, the spoke terminal 800 can implement an alternate peak search. Upon finding a correlation peak, the searcher 808 can continue searching for an alternate correlation peak having a stronger correlation. Thus, if searcher initially detects the weaker (undesired) peak, the alternate peak search can identify the stronger (desired) peak upon further searching. Since the correlation peaks corresponding to the first antenna and second antenna are separated by the known $\Delta T$ in time, the searching can be focused on searching timing positions separated from the discovered peak by $\Delta T$ (plus or minus some additional time offset to account for differences in path length as discussed above).

The spoke terminal 800 can also use knowledge of the $\Delta T$ when switching. For example, if the spoke terminal is currently using left hand circular polarization (e.g., corresponding to antenna 1 on the hub terminal) but has been commanded to switch to right hand circular polarization (e.g., corresponding to antenna 2 on the hub terminal and delayed in time), the spoke terminal knows that a correlation peak should be found at a time delay $\Delta T$ from the present timing position it is locked onto when it switches polarization.

As mentioned above, path length differences can result in additional time delay difference between the signal arriving at the spoke terminal from first antenna of the hub and the signal arriving at the spoke terminal from the second antenna of the hub terminal. Accordingly, the $\Delta T$ value used by the spoke receiver can be adjusted to accommodate for this additional delay if the additional delay is significant. For example, the controller (e.g., in the hub terminal or the spoke terminal) can use the locations of the spoke terminal and the hub terminal to compute the path lengths between the spoke terminal and each of the first and second antennas. The path length differ- ence can then be used to adjust the $\Delta T$ value (e.g., provided to the spoke terminal in command data).

The spoke terminal can also include a transmitter for transmission 810 on the uplink. As mentioned above, the uplink can use TDMA, FDMA, CDMA, or a combination thereof. If desired, the transmitter can use timing slaved to the timing of the direct sequence spread spectrum signal received by the receiver. For example, the timing of the pseudonoise code on the downlink signal can have a predefined relationship to frame and slot timing on the uplink. If desired, the controller 806 or receiver 804 can control the timing used by the transmitter. For example, the controller can adjust timing of the transmitter when switching between polarizations. As another example, the receiver can adjust timing of the transmitter based on command data 818 received on the downlink (for example, for closed loop control of transmitter timing by the hub terminal). For example, the hub terminal can calculate a propagation time delay between the hub terminal and the spoke terminal, and command the spoke terminal to adjust its transmit timing so that transmissions from the spoke terminal arrive a the hub terminal within a predefined timing window.

The controller 810 can thus execute a process of controlling polarization and timing in a spoke terminal (i.e., a spoke terminal control process) as follows:

Set the antenna subsystem to the first polarization

Figure 10:
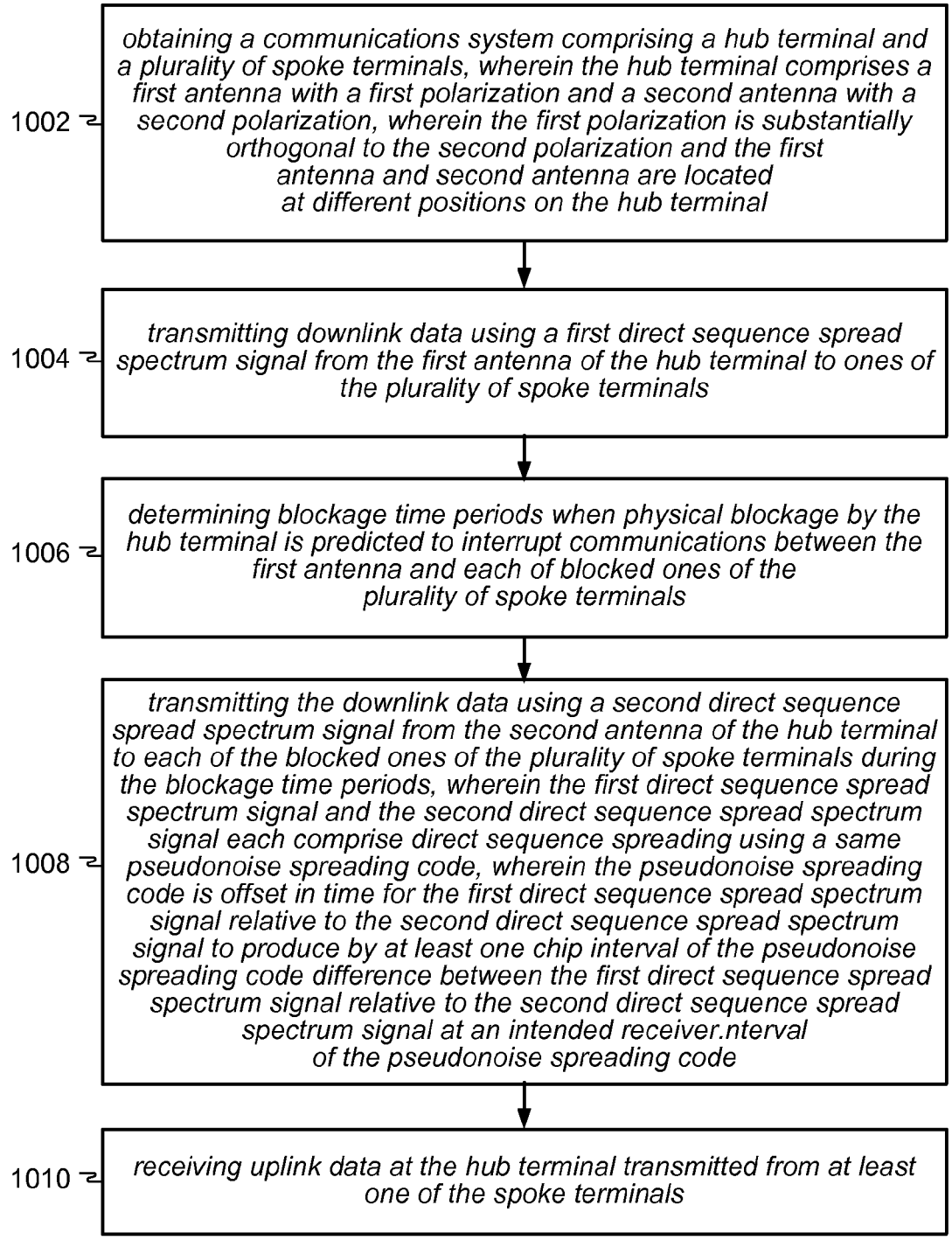
FIG. 10 is a flow chart illustrating operation of a system in accordance with some embodiments of the present invention.

When the searcher detects that a correlation peak is detected, conduct an alternate peak search at offsets of about $\Delta T$ from the correlation peak Set downlink receive timing to correspond to the timing of the strongest correlation peak Set uplink transmit timing according to the receive timing Switch the polarization to the second polarization, and adjust receive timing forward (or backward) by $\Delta T$ when command data is received instructing a switch Switch the polarization to the first polarization, and adjust receive timing backward (or forward) by $\Delta T$ when command data is received instructing a switch FIG. 10 illustrates a flow chart of a method of operating a hub terminal (i.e., a hub terminal control process) within a hub-spoke communication system. The system can be, for example, any embodiments of the system described above and illustrated in FIG. 1 (e.g., 100), the hub terminal can be, for example, any of the hub terminal embodiments described above and illustrated in FIGS. 1, 4 and 7 (e.g., 102, 400, 700), and the spoke terminal can be, for example, any of the spoke terminal embodiments described above and illustrated in FIGS. 1 and 8 (e.g., 104, 800). Thus, the method can include obtaining 1002 a communications system comprising a hub terminal and a plurality of spoke terminals, wherein the hub terminal comprises a first antenna with a first polarization and a second antenna with a second, different, polarization. The first antenna and second antenna can have different fields of view.

The method can include transmitting 1004 downlink data using a first direct sequence spread spectrum signal from a first antenna of the hub terminal to ones of the spoke terminals. For example, as described further below, the first antenna can be used for transmitting to ones of the spoke terminals for which there is no blockage of the first antenna. The transmission data rate can be reduced during blockage time periods (calculated as described below) if desired, as explained above.

The method can also include determining 1006 blockage time periods when physical blockage by the hub terminal is predicted to interrupt communications between the first antenna and each of blocked ones of the plurality of spoke terminals. Determining blockage time periods can be performed by the hub terminal (e.g., using location information of the spoke terminals received on an uplink) as described above. Alternatively, determining blockage time periods can be performed by the spoke terminal (e.g., using location information of the hub terminal received on a downlink) as described above.

When there are blocked ones of the plurality of spoke terminals, the method can include transmitting 1008 the downlink data using a second direct sequence spread spectrum signal from the second antenna of the hub terminal to each of the block ones of the plurality of spoke terminals during the blockage time periods. As discussed above, the second direct sequence spread spectrum signal can be a delayed version of the first spread spectrum signal. The first spread spectrum signal and the second spread spectrum signal can use a same pseudonoise spreading code, which is offset in time from the first spread spectrum signal relative to the second spread spectrum signal. The hub terminal can include commands in the downlink data to cause each one of blocked ones of the plurality of spoke terminals to switch polarizations and pseudonoise spreading code timing during the blockage time periods.

When there are no blocked ones of the plurality of spoke terminals (i.e., time periods other than the blockage time periods), the method can include disabling the transmitting of the downlink data from the second antenna.

Another operation in the method can be including commands in the downlink data to cause each of the blocked ones of the plurality of spoke terminals to switch polarizations and pseudonoise spreading code timing during the blockage time periods. For example, as described above, the hub terminal can transmit a command to a blocked spoke terminal prior to a time period during which blockage will occur.

The method can also include receiving 1010 uplink data from spoke terminals at the hub terminal, such data have been transmitted from the spoke terminals to the hub terminal.

If desired, transmissions on the uplink from the spoke terminals to the hub terminals can use a TDMA scheme, with timing (e.g., frame and slot boundaries) defined by the timing of the downlink. The method can thus also include controlling a switch to alternatively connect a hub receiver to one of the first antenna and the second antennas for each time slot based on the blockage time periods to enable receiving the transmissions for each of the plurality of spoke terminals. If desired, the uplink timing can be further controlled by calculating a propagation time delay between the hub terminal and each one of the plurality of spoke terminals, and adjusting the timing of the uplink transmissions from the spoke terminals to compensate for the propagation delay so that transmissions from the spoke terminals arrive at the hub terminal within predefined timing windows (e.g., within the slots of the TDMA frame). The calculations can be performed by the spoke terminals, or the calculation can be performed by the hub terminal and commands sent from the hub terminal to the spoke terminals (e.g., by including commands in the downlink data) to cause each one of the plurality of spoke terminals to adjust transmit timing.

Figure 11:
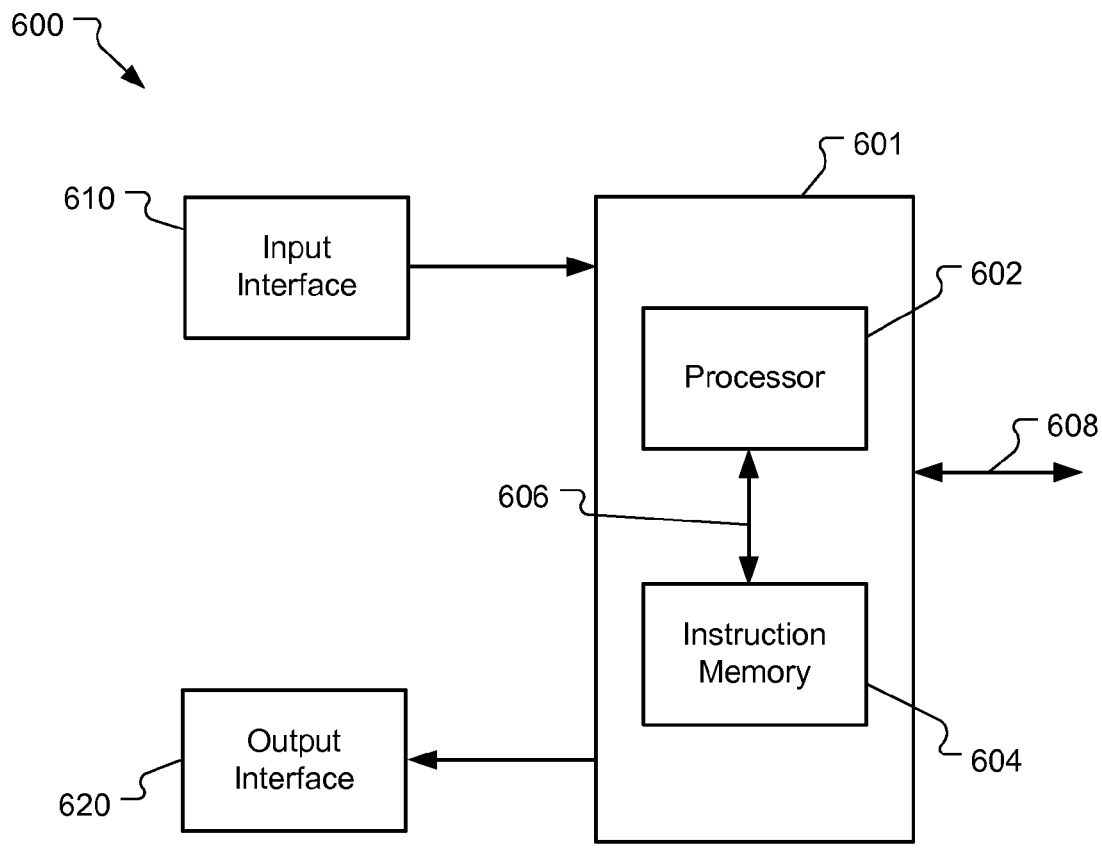
FIG. 11 is a block diagram of a computer system which can be used to implement a controller in accordance with some embodiments of the present invention.

In some embodiments, all or part of a controller (e.g., controller 412, 712, 806) can be implemented in software for execution on a specialized or general purpose processor. For example, FIG. 11 illustrates a computer system 600 which can be used to implement one or more functions of the controller in either the hub or spoke terminals. The computer system can include a general-purpose or special-purpose processing subsystem 601. For example, the computer system can be a personal computer, a notebook computer, a personal digital assistant (PDA) or other hand-held device (e.g., a cellular telephone), a workstation, a minicomputer, a mainframe, a supercomputer, a multi-processor system, a network computer, a processor-based electronic device, or the like which is coupled to the other components of the hub terminal 102 or spoke terminal 104. The processing subsystem can include a processor 602 and an instruction memory 604. The processor can be capable of executing computer-executable instructions received from the instruction memory via a bus 606 or similar interface. The processor can be a single processor or multiple processors (e.g., a central processor and one or more other processors designed to perform a particular function or task). The instruction memory can be integrated into the same semiconductor device or package as the processor. The bus can be configured to connect various components of the computer system, and can include any of a variety of bus structures including a memory bus or memory controller, a peripheral bus, or a local bus that uses any of a variety of bus architectures. The bus can be used to interconnect the processor, instruction memory, and other components, such as mass storage devices, input/output interfaces, network interfaces, and the like.

As describer further below, computer-executable instructions can cause the processor 602 to execute functions to implement operations in methods as described above. The computer-executable instructions can be permanently stored in the instruction memory 604 or temporarily stored in the instruction memory and loaded into the instruction memory from a computer-readable medium, for example, via an interface 608. The computer-executable instructions can include data structures, objects, programs, routines, or other program modules that can be accessed by the processor. For example, computer executable instructions can include operating system instructions used to establish communication or enable loading of programs, such as during start-up of the computer system. In general, computer-executable instructions cause the processor to perform a particular function or group of functions and are examples of program code means for implementing methods disclosed herein. Furthermore, a particular sequence of the executable instructions provides an example of corresponding acts that can be used to implement the operations of such methods.

Examples of computer-readable media include random-access memory (RAM), read-only memory (ROM), programmable read-only memory (PROM), erasable programmable read-only memory (EPROM), electrically-erasable programmable read-only memory (EEPROM), compact disk read-only memory (CD-ROM), digital video disk (DVD), magnetic medium, or any other device or component that is capable of providing data or executable instructions that can be accessed by a processor. Computer-readable media can be a non-transitory media (e.g., a physical device as described above) which allows for permanent, semi-permanent, or temporary storage of executable instructions.

The computer system 600 can include various input/output interfaces, including for example an input interface 610 which can be used to accept data from a receiver (e.g., receivers 720, 804). The input interface can use, for example, a serial interface, a parallel interface, a universal serial bus (USB) interface, a firewire interface (IEEE 1394), and the like. The computer system can also include an output interface 620 which can be used to provide data to a transmitter (e.g., transmitters 402, 702, 810). The output interface can be the same or different than the input interface. The computer system can also include other interfaces to components of the spoke terminal, for example, to control other spoke terminal functions.

Accordingly, the computer system 600 can be used to implement the controller in distinct software modules. The software modules can include instructions to cause the processor 602 to implement the modules. For example, the instructions can correspond to the flow chart of FIG. 10 to provide a computer-implemented method for operating a hub terminal within a hub-spoke communication system. As another example, the instructions can cause the processor to implement a process of determining when blockage of a spoke terminal exists as described above. As another example, the instructions can cause the processor to implement a process of controlling polarization and timing in a spoke terminal. Software modules can include, for example: a hub terminal control process, a hub terminal blockage process, a spoke terminal blockage process, and a spoke terminal control process, each operating as described above.

The techniques described herein can be implemented in a wireless communications system using any of a variety of different waveforms. For example, the wireless communications can be radio communications, optical communications, acoustic communications, and the like. The system can include the use of spread spectrum (e.g., frequency hopping and/or direct sequence spreading), modulation, forward error correction coding, and other known communications techniques. The transmitter and receiver can include components such as modulators, spreaders, despreaders, demodulators, encoders, decoders, interleavers, deinterleavers, upconverters, downconverters, amplifiers, filters, local oscillators, mixers, and other similar components. The waveform on the uplink and the downlink need not be the same. For example, the hub terminal can receive data on the uplink which uses a first waveform (e.g., first modulation format, first data rate, and/or first coding) and retransmit the data on the downlink with a second waveform (e.g., a second modulation format, second data rate, and/or second coding). The data rates on the uplink and downlink can be different.

While the examples illustrated above have used a single uplink and downlink channel, the techniques can be applied when more than one channel are available. For example, transmission of data can be performed on a first downlink channel, and transmission of commands can be performed on a second downlink channel. For example, the first downlink channel can be a high bandwidth channel, and the second downlink channel can be a low bandwidth channel.

The number of uplink and downlink channels need not be the same. For example, multiple uplink channels operating at a first data rate can be provided, and the hub can retransmit packets received on the multiple uplinks all on a second downlink channel operating at a second data rate which is higher than the first data rate.

The techniques described herein can provide a number of benefits in some embodiments. For example, by using a second antenna with a different field of view from a first antenna, the hub terminal can reduce the potential for link disruption between the hub and a spoke, helping to improve communications reliability within the network. By only transmitting on the second antenna when needed, interference can be mitigated, and higher data throughputs can be provided. By using a combination of polarization and spread-spectrum, interference between transmissions from the first antenna and second antenna are mitigated. Higher data rates can be obtained when no blockage is present by disabling the spread spectrum.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method of improving the reliability of a hub-spoke communications system, comprising:
    obtaining a communications system comprising a hub terminal and a plurality of spoke terminals, wherein the hub terminal comprises a first antenna with a first polarization and a second antenna with a second polarization, wherein the first polarization is substantially orthogonal to the second polarization and the first antenna and second antenna are located at different positions on the hub terminal;
    transmitting downlink data using a first direct sequence spread spectrum signal from the first antenna of the hub terminal to ones of the plurality of spoke terminals;
    determining blockage time periods when physical blockage by the hub terminal is predicted to interrupt communications between the first antenna and each of blocked ones of the plurality of spoke terminals; and
    transmitting the downlink data using a second direct sequence spread spectrum signal from the second antenna of the hub terminal to each of the blocked ones of the plurality of spoke terminals during the blockage time periods, wherein the first direct sequence spread spectrum signal and the second direct sequence spread spectrum signal each comprise direct sequence spreading using a same pseudonoise spreading code, wherein the pseudonoise spreading code is offset in time for the first direct sequence spread spectrum signal relative to the second direct sequence spread spectrum signal to produce at least one chip interval of difference of the pseudonoise spreading code of the first direct sequence spread spectrum signal relative to the second direct sequence spread spectrum signal at an intended receiver,
    wherein the determining blockage time periods comprises:
        obtaining, at the hub terminal, a predicted position of each of the plurality of spoke terminals, calculating, at the hub terminal, a pointing angle between the hub terminal and each of the plurality of spoke terminals using a predicted position of the hub terminal, and comparing, at the hub terminal, the pointing angles to a hub terminal blockage database to determine the blockage time periods; or
        obtaining, at one of the plurality of spoke terminals, a predicted position of the hub terminal, calculating, at the spoke terminal, a pointing angle between the hub terminal and the one of the plurality of spoke terminals using the predicted position of the hub terminal, and comparing, at the spoke terminal, the pointing angle to a hub terminal blockage database to determine the blockage time periods.

2. The method of claim 1, further comprising: disabling the transmitting the downlink data using a second direct sequence spread spectrum signal from the second antenna during time periods other than the blockage periods.

3. The method of claim 1, wherein the first antenna has a field of view different from a field of view of the second antenna.

4. The method of claim 1, wherein the determining blockage time periods comprises:
    the obtaining, at the hub terminal, a predicted position of each of the plurality of spoke terminals;
    the calculating, at the hub terminal, a pointing angle between the hub terminal and each of the plurality of spoke terminals using a predicted position of the hub terminal; and
    the comparing, at the hub terminal, the pointing angles to a hub terminal blockage database to determine the blockage time periods.

5. The method of claim 4, wherein the determining blockage time periods comprises:
the obtaining, at one of the plurality of spoke terminals, a predicted position of the hub terminal;
the calculating, at the spoke terminal, a pointing angle between the hub terminal and the one of the plurality of spoke terminals using the predicted position of the hub terminal; and
the comparing, at the spoke terminal, the pointing angle to a hub terminal blockage database to determine the blockage time periods.

6. The method of claim 1, further comprising:
transmitting uplink data from at least one of the spoke terminals to the hub terminal; and
receiving the uplink data at the hub terminal.

7. The method of claim 1, further comprising:
assigning transmissions for each of the plurality of spoke terminals to time slots; and
controlling a switch to alternatively connect a hub receiver to one of the first antenna and the second antenna for each time slot based on the blockage time periods to enable receiving the transmissions for each of the plurality of spoke terminals.

8. The method of claim 1, wherein the hub terminal is disposed on an airborne platform.

9. The method of claim 1, further comprising including commands in the downlink data to cause each of the blocked ones of the plurality of spoke terminals to switch polarization and pseudonoise spreading code timing during the blockage time periods.

10. The method of claim 1, further comprising reducing a transmission data rate during blockage time periods.

11. A hub terminal for improving communications reliability in a hub-spoke communications system comprising a plurality of spoke terminals, the hub terminal comprising:
a direct sequence spread spectrum transmitter capable of transmitting a direct sequence spread signal using a pseudonoise spreading code;
a first antenna having a first polarization coupled to the transmitter;
a second antenna having a second polarization coupled to the transmitter, wherein the second polarization is substantially orthogonal to the first polarization, and the second antenna has a different field of view from the first antenna;
a delay element disposed between the transmitter and at least one of the first antenna and the second antenna, wherein the delay line provides a delay of at least one chip interval of the pseudonoise spreading code;
a switch disposed between the transmitter and the second antenna; and
a controller coupled to the switch, wherein the controller:
determines time periods during which blockage is present between the first antenna and any of the plurality of spoke terminals by at least obtaining a predicted position of each of the plurality of spoke terminals, calculating a pointing angle between the hub terminal and each of the plurality of spoke terminals using a predicted position of the hub terminal, and comparing the pointing angles to a hub terminal blockage database to determine the blockage time periods, and
closes the switch during the time periods during which blockage is present between the first antenna and any of the plurality of spoke terminals and opens the switch during time periods during which no blockage is present between the first antenna and any of the plurality of spoke terminals.

12. The terminal of claim 11, wherein the delay element is any of: a transmission line, a delay line, and a surface acoustic wave device.

13. The terminal of claim 11, further comprising a receiver coupled to the controller, wherein the receiver receives spoke terminal location information and provides the spoke terminal location information to the controller.

14. The terminal of claim 11, wherein the controller provides command data to the transmitter, the command data providing polarizing selection and timing adjustment information to the plurality of spoke terminals.

15. The terminal of claim 11, further comprising:
a receiver;
a second switch coupling the receiver alternatively to the first antenna and the second antenna, wherein the controller controls the second switch based on uplink time slot assignments of the spoke terminals and the blockage time periods.

16. A spoke terminal for improving communications reliability in a hub-spoke communications system comprising a hub terminal, the spoke terminal comprising:
an antenna subsystem capable of reception using at least a first polarization and a second polarization, the first polarization being substantially orthogonal to the second polarization;
a direct sequence spread spectrum receiver coupled to the antenna subsystem and capable of receiving a direct sequence spread spectrum signal using a pseudonoise spreading code; and
a controller coupled to the receiver and the antenna subsystem, wherein the controller accepts command data embedded within the spread spectrum signal from the receiver, selects a polarization used by the antenna subsystem according to the command data, and adjusts a timing of the direct sequence spread spectrum receiver according to the command data,
wherein the controller further determines blockage time periods between the spoke terminal and the hub terminal by at least obtaining a predicted position of the hub terminal, calculating a pointing angle between the hub terminal and the spoke terminal using the predicted position of the hub terminal, and comparing the pointing angle to a hub terminal blockage database to determine the blockage time periods.

17. The terminal of claim 16, further comprising a transmitter coupled to the receiver and configured to transmit a transmit signal having timing slaved to timing of the direct sequence spread spectrum signal received by the receiver.

18. The terminal of claim 17, wherein the controller adjusts timing of the transmit signal based on the command data.

19. The terminal of claim 16, wherein the controller adjusts the timing of the direct sequence spread spectrum receiver in response to command data by one of: advancing and retarding a predefined amount of time delay.

20. The terminal of claim 16, further comprising a searcher coupled to the antenna subsystem and capable of searching for a spread spectrum signal correlation peak.

21. The terminal of claim 20, wherein, upon finding a correlation peak, the searcher continues searching for an alternative correlation peak having a stronger correlation than the spread spectrum signal correlation peak.

* * * * *